United States Patent
Peterson et al.

(10) Patent No.: US 11,277,336 B2
(45) Date of Patent: Mar. 15, 2022

(54) TUNNEL-BASED NETWORK CONNECTIVITY FOR COMPUTING CLUSTERS

(71) Applicant: Red Hat, Inc., Raleigh, NC (US)

(72) Inventors: Michel Peterson, Ra'anana (IL);
Michael Kolesnik, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 16 days.

(21) Appl. No.: 15/931,150

(22) Filed: May 13, 2020

(65) Prior Publication Data

US 2021/0359935 A1 Nov. 18, 2021

(51) Int. Cl.
| | |
|---|---|
| *H04L 12/50* | (2006.01) |
| *H04L 45/00* | (2022.01) |
| *H04L 45/44* | (2022.01) |
| *H04L 61/5007* | (2022.01) |
| *H04L 67/10* | (2022.01) |
| *H04L 12/46* | (2006.01) |

(52) U.S. Cl.
CPC .......... *H04L 45/46* (2013.01); *H04L 12/4633* (2013.01); *H04L 45/44* (2013.01); *H04L 61/2007* (2013.01); *H04L 67/10* (2013.01)

(58) Field of Classification Search
CPC ..... H04L 45/46; H04L 45/44; H04L 12/4633; H04L 61/2007; H04L 67/10
USPC ........................................................ 370/392
See application file for complete search history.

(56) References Cited

U.S. PATENT DOCUMENTS

| | | | |
|---|---|---|---|
| 9,407,532 B2 | 8/2016 | Wang | |
| 10,778,457 B1* | 9/2020 | Mathew | ................ H04L 12/185 |
| 2014/0082197 A1* | 3/2014 | Wang | .................. H04L 12/4633 |
| | | | 709/225 |
| 2014/0086253 A1* | 3/2014 | Yong | ........................ H04L 45/50 |
| | | | 370/395.53 |
| 2014/0161029 A1* | 6/2014 | Gan | ........................ H04W 40/36 |
| | | | 370/328 |
| 2019/0104413 A1* | 4/2019 | Cidon | ...................... H04L 41/12 |
| 2019/0273683 A1* | 9/2019 | Jiang | ................... H04L 61/2007 |

OTHER PUBLICATIONS

C. Perkins, "IP Encapsulation within IP", Oct. 1996, Network Working Group of The Internet Engineering Task Force, https://datatracker.ietf.org/doc/html/rfc2003 (Year: 1996).*

(Continued)

*Primary Examiner* — Ruolei Zong
(74) *Attorney, Agent, or Firm* — K&L Gates LLP

(57) ABSTRACT

Methods and systems for communicating between nodes within computing clusters. In one embodiment, a method is provided that includes receiving, at a first node within a first cluster, a packet for transmission from a second node within the first cluster. The packet for transmission may be received via a local tunnel of the first cluster. A routing agent of the first node may identify a first destination address included within the packet for transmission and determine that the first destination address corresponds to a second cluster. The routing agent may also generate a second destination address corresponding to a third node of the second cluster and transmit the packet to the second destination address via an external tunnel between a plurality of clusters including the first cluster and the second cluster.

20 Claims, 8 Drawing Sheets

(56) References Cited

OTHER PUBLICATIONS

Best practices for enterprise multi-tenancy; Google Cloud; https://cloud.google.com/kubernetes-engine/docs/best-practices/enterprise-multitenancy; retrieved Feb. 10, 2020 (18 pages).
Packet Walk(s) In Kubernetes by Don Jayakody, Big Switch Networks, https://cloud.google/com/kubernetes-engine/docs/best-practices/enterprise-multitenancy; retrieved Feb. 10, 2020 (50 pages).
Cluster Networking—Kubernetes; https://kubernetes.io/docs/concepts/cluster-administration/networking/; retrieved Feb. 10, 2020 (12 pages).
Network Architecture Design for Microservices on GCP by Raphael Fraysse; Sep. 2, 2019 (20 pages).

* cited by examiner

TUNNEL-BASED NETWORK CONNECTIVITY FOR COMPUTING CLUSTERS

BACKGROUND

Computing systems may rely on distributed computing environments to execute one or more functions and/or to provide computing services. Distributed computing environments may provide computing resources that can be used by the computing systems to execute the functions and/or computing services. In particular, the distributed computing environments may allocate a portion of the computing resources (e.g., processing, storage, input/output resources) to execute requested functions and/or computing services.

SUMMARY

The present disclosure presents new and innovative systems and methods for communicating between nodes within computing clusters. In one embodiment, a method is provided that includes receiving, at a first node within a first cluster, a packet for transmission from a second node within the first cluster, the packet for transmission received via a local tunnel of the first cluster. The method may also include identifying, by a routing agent of the first node, a first destination address included within the packet for transmission and determining, by the routing agent, that the first destination address corresponds to a second cluster. The method may further include generating, by the routing agent, a second destination address corresponding to a third node of the second cluster and transmitting, by the routing agent, the packet to the second destination address via an external tunnel between a plurality of clusters including the first cluster and the second cluster.

In another embodiment, a system is provided including a first cluster containing a first node and a second node. The first node may be configured to receive an external transmission request from a third node within a second cluster and the external transmission request may be received via an external tunnel between a plurality of clusters including the first cluster and the second cluster. The first node may include a routing agent configured to extract a packet from the external transmission request, identify an external address associated with the second node, and transmit the packet to the second node via a local tunnel of the first cluster.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
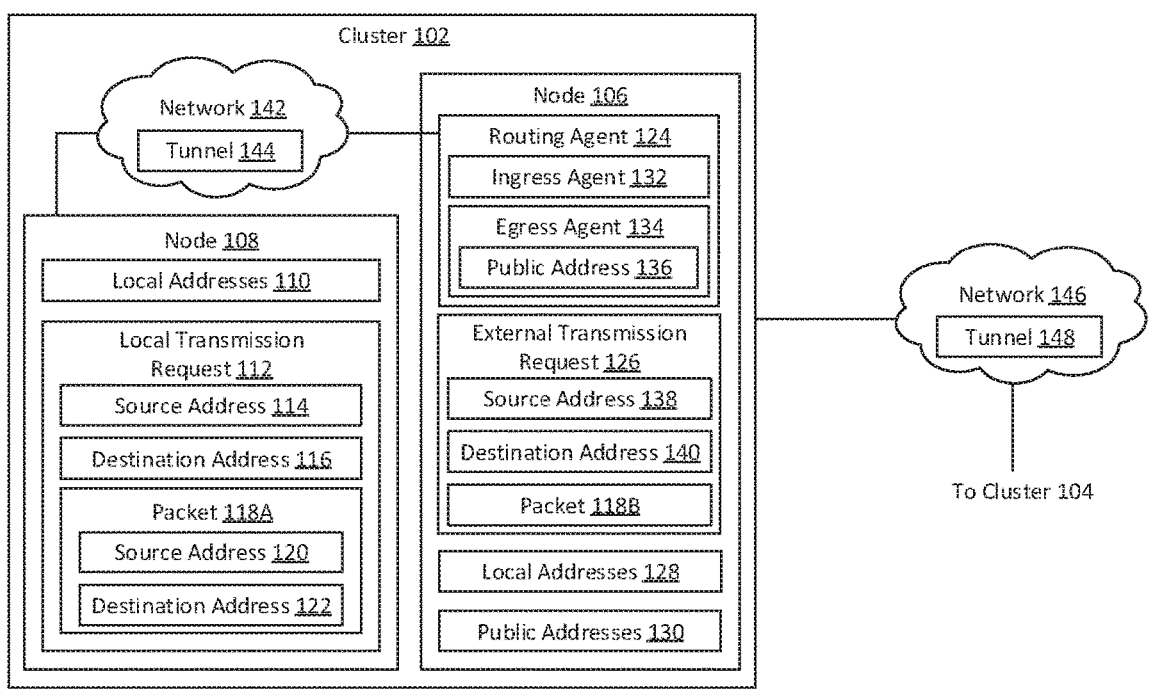
FIGS. 1A-1B illustrate systems for computing cluster communication according to exemplary embodiments of the present disclosure.

Distributed computing environments (e.g., cloud computing environments such as Kubernetes® computing environments) may be organized into one or more computing clusters. In particular, the computing clusters may include computing resources allocated to and used to execute particular functions or computing services. The computing clusters may include one or more nodes used to execute the functions or computing services (e.g., "work units"). The nodes or work units within a particular computing cluster may communicate with one another. Additionally, nodes or work units in a computing cluster may communicate with nodes or work units in other computing clusters. Existing systems may connect the nodes and work units directly to a global network (i.e., the Internet) for communication. However, such systems require a separate IP address for each node or work unit, which can exhaust the IP address space. Additionally, connecting each node or work unit directly to the global network increases exposure to attacks and other unauthorized access to the nodes or work units. Therefore, there exists a need for connecting nodes in different computing clusters in a private manner.

Also, to communicate with one another, nodes and work units in different computing clusters need addresses to identify one another. In certain instances, existing computing clusters may utilize classless inter-domain routing (CIDR) systems to assign local IP addresses to nodes or work units within the computing clusters. When nodes and work units in different computing clusters communicate with one another, nodes may use the local address to identify destination nodes for particular communications. However, in certain instances, the address space (e.g., the CIDR address space) utilized by one computing cluster may overlap with the address space used by another computing cluster. In such instances, communications between nodes or work units of the overlapping computing clusters may be improperly routed. Therefore, there exists a need to provide non-overlapping address spaces for communication between nodes and work units of different computing clusters while also ensuring compatibility with the local address spaces of the computing clusters.

One solution to these problems is to utilize tunnels to communicate between nodes within a computing cluster and between nodes in different computing clusters. For example, an OpenShift® platform may be configured to utilize tunnels to communicate between nodes. To facilitate such communications, routing agents may be provided to nodes within the computing cluster (e.g., to gateway nodes) that determine tunnel routing (e.g., tunnel addresses) based on the network addresses within the packet. Additionally, in certain instances, a global address space may be utilized to individually address nodes and work units executing within the nodes. The global address space may be used for communication between the nodes and/or work units. In particular, the global address space may include subsets of addresses (e.g., subnets) allocated to individual clusters. The clusters may assign addresses to nodes and work units from within the assigned subsets, eliminating the risk of different clusters assigning overlapping addresses to different nodes and work units.

Figure 1B:
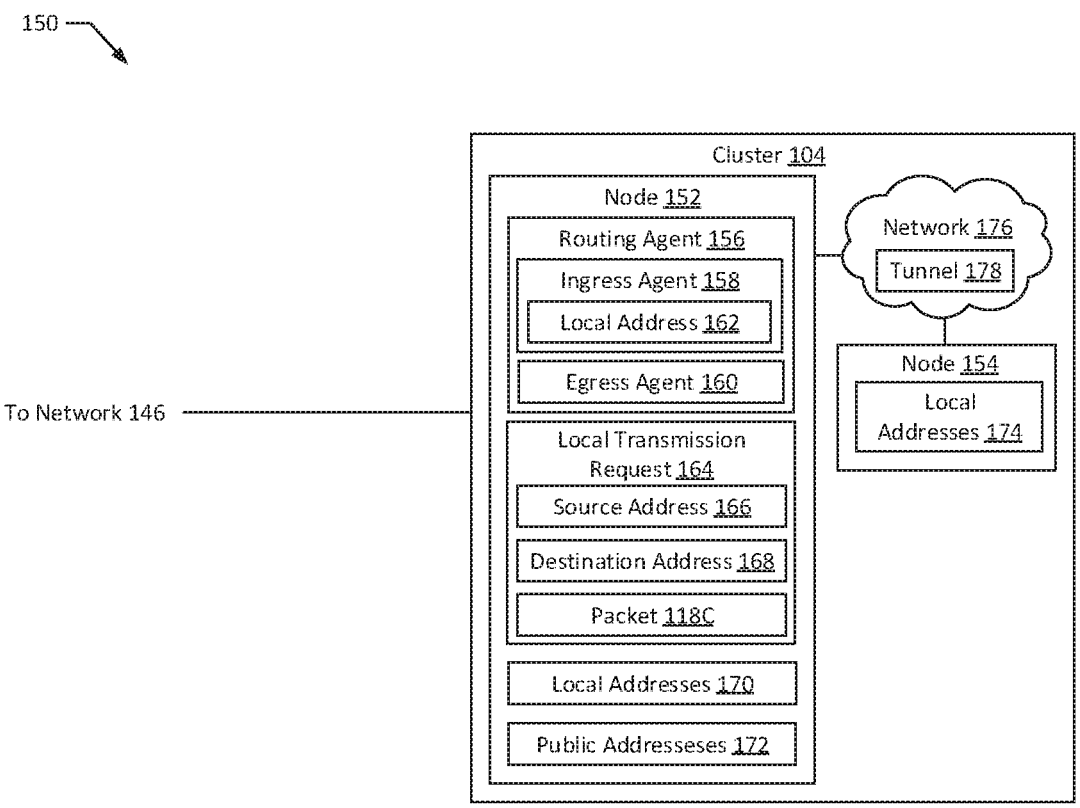

FIGS. 1A-1B illustrate systems 100, 150 for computing cluster communication according to exemplary embodiments of the present disclosure. The systems 100, 150 may be configured to enable private communication between nodes in different computing clusters. For example, the systems 100, 150 may combine to form a single system enabling communication between different computing clusters. The system 100 includes a cluster 102 and the system 150 includes a cluster 104, which may be configured to execute functions and computing services using one or more nodes. For example, the cluster 102 includes nodes 106, 108 and the cluster 104 includes nodes 152, 154. The nodes 106, 108, 152, 154 may be configured to receive and execute work units (e.g., pods, services, functions, applications, or other computing services). In particular, the nodes 106, 108, 152, 154 may contain computing hardware such as memory, processors (e.g., central processing units, graphical processing units) and may be configured to execute received functions, applications, or other computing services using the computing hardware. As a specific example, the work units may execute as pods (e.g., Kubernetes® pods) and/or services (e.g., Kubernetes® services) of the cloud computing environment. In certain implementations, the nodes 106, 108, 152, 154 may be implemented as separate computing devices contained within the clusters 102, 104. For example, the clusters 102, 104 may be implemented as collections of discrete computing devices (e.g., discrete collections of server-mounted computing devices).

To facilitate communication between the nodes 106, 108, 152, 154, the clusters 102, 104 contain networks 142, 176. The networks 142, 176 may be implemented as local networks (e.g., local area networks (LANs), container network interface (CNI) networks) between the computing devices implementing the nodes 106, 108, 152, 154. The nodes 106, 108, 152, 154 may be configured to communicate with other nodes in the same cluster 102, 104 using the networks 142, 176. For example, node 106 may communicate with the node 108 via the network 142 and the node 152 may communicate with node 154 via the network 176. In certain implementations, communication within the clusters 102, 104 may occur via local tunnels within the cluster 102, 104. For example, the networks 142, 176 may implements tunnels 144, 178 for use by the nodes 106, 108, 152, 154 when communicating with other nodes in the same cluster 102, 104. Tunnels 144, 178 may be implemented to publicly or privately route data packets between the nodes 106, 108, 152, 154 using networks 142, 176. For example, the tunnels 144, 178 may be implemented using one or more tunneling protocols, such as virtual extensible LAN (VXLAN), GENEVE from Red Hat®, IP Security (IPSec), WireGuard, and the like. In certain implementations, the tunnels 144, 178 may be implemented to provide a private network between the nodes 106, 108, 152, 154. Additionally or alternatively, the tunnels 144, 178 may be secured (e.g., encrypted) and/or unsecured. In the presently-discussed examples, nodes are described as communicating with one another. In practice, it should be understood that communications may also occur between work units executing on different nodes. Accordingly, in any example of the present disclosure describing communication between two different nodes or communication to a particular node, it should be understood that communication may similarly take place between work units executing on the two different nodes and/or to work units executing on the particular node using similar techniques.

To communicate using the tunnels 144, 178, the nodes 106, 108, 152, 154 may be assigned one or more local addresses 110, 128, 170, 174. As explained further below, the local addresses 110, 128, 170, 174 may include separate addresses for each of the nodes 106, 108, 152, 154 for communication via the networks 142, 176 and communication via the tunnels 144, 178. Additionally or alternatively, the local addresses 110, 128, 170, 174 may include separate addresses for work units executing on the nodes 106, 108, 152, 154.

The clusters 102, 104 may communicate with one another via the network 146. In particular, nodes 106, 108 within the cluster 102 may communicate with nodes 152, 154 within the cluster 104 via the network 146. In certain implementations, the network 146 may be implemented as a public network or a global network, such as the Internet. In certain implementations, the network 146 may implement one or more external tunnels between the clusters 102, 104. For example, the network 146 includes a tunnel 148, which may be used to communicate between the clusters 102, 104. Similar to the tunnels 144, 178, the tunnel 148 may be configured to publicly or privately route data packets from nodes 106, 108 within the cluster 102 to nodes 152, 154 in the cluster 104, and vice versa. The tunnel 148 may be implemented using any of the above-discussed tunneling protocols. In certain implementations, the tunnels 144, 178 within the clusters 102, 104 may be implemented with a different tunneling protocol than the tunnel 148 within the network 146 between the clusters 102, 104. For example, the tunnels 144, 178 may be implemented with unsecured tunneling protocols and the tunnel 148 may be implemented with a secured tunneling protocol.

To communicate using the tunnel 148, the clusters may be assigned one or more public addresses. In particular, the clusters 102, 104 may be configured to communicate with one another via particular gateway nodes that are connected to the network 146. For example, only a subset of the nodes (e.g., one node) in each cluster may be connected to the network 146 and the tunnel 148. In particular, the node 106 may connect the cluster 102 to the network 146 and the node 152 may connect the cluster 104 to the network 146. Nodes 106, 152 connected to the network 146 may include public addresses 130, 172 used to identify and communicate with the clusters 102, 104 connected to the network 146. In certain implementations, the gateway nodes 106, 152 may be implemented as master nodes (e.g., a Kubernetes® master nodes) of the cluster. In further implementations, the gateway nodes 106, 152 may include any node connected to the network 146.

Nodes 106, 152 connected to the network 146 may also include routing agents 124, 156. The routing agents 124, 156 may be responsible for receiving communications from other nodes 108, 154 within the clusters 102, 104 and routing the communications via the network 146 and the tunnel 148. In particular, and as explained further below, the routing agents 124, 156 may determine public addresses 136 for transmissions from the nodes 106, 152 and may determine local addresses 162 for transmissions received by the nodes 106, 152. In particular, in certain instances, the routing agents 124, 156 may include an egress agent 134, 160 configured to determine public addresses 136 of other clusters to which a transmission is to be sent. The routing agents 124, 156 may additionally include ingress agents 132, 158 configured to determine local addresses 162 of nodes within the cluster 102, 104 for which a received transmission is intended.

The routing agents 124, 156 may be implemented as software executing within the nodes 106, 152. For example, the routing agents 124, 156 may be implemented as work units executing within the nodes 106, 152 (e.g., executing using allocated hardware of the nodes 106, 152). In additional or alternative implementations, the routing agents 124, 156 may be implemented separate from the nodes 106, 152. For example, nodes 106, 152 connected to the network 146 may be connected to the network 146 by the routing agents 124, 156, which may be configured to determine the addresses as described further herein. In particular, in certain instances, the routing agents 124 may implement a global address space configured to avoid collisions or overlaps between nodes 106, 108, 152, 154 within different clusters. In particular, in the global address space, each node 106, 108, 152, 154 may have an assigned external address that may be used to individually identify a node 106, 108, 152, 154 within communications intended for the node 106, 108, 152, 154.

Similarly, in certain implementations, the ingress agents 132, 158 and egress agents 134, 160 may be implemented separately from the routing agents 124, 156. For example, the ingress agents 132, 158 and egress agents 134, 160 may execute as work units executing within the nodes 106, 152 (e.g., separate work units from the routing agents 124, 156. Additionally or alternatively, the ingress agents 132, 158 and egress agents 134, 160 may be optional. For example, the ingress agents 132, 158 and egress agents 134, 160 may be configured to determine external addresses for nodes and work units within the clusters 102, 104. In particular, the ingress agents 132, 158 and egress agents 134, 160 may be configured to overwrite or translate the source address 120 and destination address 122 of the packet 118A-C. In such instances, where global address spaces are not implemented for communication between the clusters 102, 104, the ingress agents 132, 158 and egress agents 134, 160 may be omitted.

In certain instances, the routing agents 124, 156 may identify the public addresses 136 and local addresses 162 based on repositories identifying the appropriate addresses of particular nodes 106, 108, 152, 154, work units, and/or particular clusters 102, 104. For example, each routing agent 124, 156 may be configured to access a repository (not depicted) or other mapping storing public addresses 130, 172 associated with gateway nodes 106, 152 of each cluster 102, 104 connected to the network 146. In certain implementations, the repository or other mapping may store local addresses 110, 128, 170, 174 of nodes 106, 108, 152, 154 and work units within the clusters 102, 104 and may additionally store external addresses of the nodes 106, 108, 152, 154 and work units (discussed further below). In such instances, the public addresses 136 may be identified by consulting the repository for the correct public address. The repository may be implemented as a database, which may be accessible at a centralized location. For example, the database may be connected to the network 146 and/or may be created and maintained within a particular gateway node connected to the network 146. Additionally or alternatively, the routing agents 124, 156 may maintain local copies of the database (e.g., to reduce network delays, network traffic, and/or request latency). In implementations where the routing agents 124, 156 maintain local copies of the database, the database itself may be centrally maintained by a single node, cluster, or routing agent. For example, a particular routing agent may receive updates from other routing agents connected to the network 146 indicating changes to the addresses of nodes within the respective clusters. The particular routing agent may then update the database and transmit a copy of the database to other routing agents connected to the network 146. Additionally or alternatively, the database may be updated in a distributed fashion. For example, routing agents may transmit updates to one another and, upon receiving an update to particular addresses from other routing agents, each routing agent may update the respective copy of the database. The routing agents 124, 156 may similarly consult a repository when identifying a local address 162 for received communications. For example, the repository of local addresses 162 may be stored within the cluster 102 (e.g., within the routing agent 124, 156 and/or within a node connected to the network 142). In certain implementations, routing agents may transmit updates to the database for changes to local addresses.

Turning now to a specific example, the nodes 106, 108, 152, 154 may be configured to communicate with one another using transmission requests. For example, the node 108 includes a local transmission request 112, which may be generated to request transmission to a node in another cluster. In particular, the local transmission request 112 may be generated to transmit a packet 118A from a work unit executing on the node 108 of the cluster 102 to a work unit executing on the node 154 of the cluster 104. The local transmission request 112 includes a source address 114, a destination address 116, and the packet 118A. The packet 118A further includes a source address 120 and a destination address 122. The source address 120 may identify the work unit (e.g., a pod or service executing within the node 108) and/or the node 108 requesting transmission of the packet 118A and the destination address 122 may identify the node 154 or the work unit and/or the node 154 to which the packet 118A is to be transmitted. In certain implementations, the source address 120 may be implemented as a local address 110 of the transmitting work unit or the node 108 and the destination address 122 may be implemented as a local address 174 of the receiving work unit or the node 154. In particular, the source address 120 and the destination address 122 may be implemented as local addresses of the nodes 108, 154 or work units within the local networks 142, 176 of the clusters 102, 104. Additionally or alternatively, the source address 120 and the destination address 122 may be implemented as local addresses of the nodes 108, 154 or work units within the local tunnels 144, 178 of the clusters 102, 104. The source address 114 may identify the node 108 and may be used by the node 106 for subsequent transmissions. In particular, the source address 114 may be one of the local addresses 110 associated with the node 108 or transmitting work unit. The destination address 116 may identify a gateway node 106 within the cluster 102 to which the local transmission request 112 is transmitted. For example, the local transmission request 112 may be transmitted to the node 106 for subsequent transmission of the packet 118A to the node 154 and the destination address 116 may identify the node 106. In certain implementations, the source address 114 and the destination address 116 may be implemented as local addresses of the nodes 108, 106 or transmitting work unit within the tunnel 144 of the cluster 102. Additionally or alternatively, the source address 114 and the destination address 116 may be implemented as local addresses of the nodes 106, 108 or transmitting work unit within the network 142. After generating the local transmission request 112, the node 108 may transmit the local transmission request 112 to the node 106 (e.g., via the tunnel 144). In certain implementations, to transmit the local transmission request 112, the source address 114 and/or the destination address 116 may be updated to a local address of the node 106 within the tunnel 144.

After receiving the local transmission request 112 (e.g., via the network 142 and/or the tunnel 144), the node 106 may create an external transmission request 126, which may be used to transmit the packet 118B via the tunnel 148. The external transmission request 126 contains a packet 118B, which may be a copy of the packet 118A included within the local transmission request 112. The external transmission request 126 additionally includes a source address 138 and a destination address 140. The source address 138 may identify a source of the external transmission request 126. In particular, the source address 138 may identify the node 106 as the node transmitting the external transmission request 126. For example, the source address 138 may be implemented as a public address of the node 106, such as a public address of the node 106 within the network 146 and/or the tunnel 148. The destination address 140 may identify a gateway node 152 of the cluster 104 to which the external transmission request 126 is sent. For example, the destination address 140 may be implemented as a public address of the node 152, such as a public address of the node 152 within the network 146 and/or the tunnel 148. The destination address 140 may be a public address determined by the egress agent 134 (e.g., the public address 136). After generating the external transmission request 126, the node 106 may transmit the external transmission request 126 to the node 152 within the cluster 104 via the network 146 (e.g., via the tunnel 148). In certain implementations (e.g., where the destination address 140 is not implemented as a public address of the node 152 within the tunnel 148), the destination address 140 may be updated to reflect a public address of the node 152 within the tunnel 148 and/or as an external address of the node 152 (e.g., within a global address space created by the routing agents 124, 156).

After receiving the external transmission request 126, the node 152 may create a local transmission request 164. The local transmission request 164 includes a packet 118C, which may be a copy of the packet 118A-B as received via the external transmission request 126. Local transmission request 164 also includes a source address 166 and a destination address 168. The source address 166 may identify the node 152 transmitting the local transmission request 164 and the destination address 168 may identify the node 154 or work unit to which the local transmission request 164 will be transmitted. In particular, the destination address 168 may identify the destination for the packet 118C (e.g., as indicated by the destination address 122). In certain implementations, the source address 166 may be implemented as a local address 170 of the node 152 (e.g., within the network 176 and/or within the tunnel 178). Similarly, the destination address 168 may be implemented as a local address 174 of the node 154 or receiving work unit (e.g., within the network 176 and/or the tunnel 178). To generate the local transmission request 164, the node 152 may identify which node 154 within the cluster 104 is intended to receive the packet 118C as the destination address 168 for the identified node 154. The node 154 may be identified based on the destination address 122 included within the packet 118C. For example, the node 152 may identify a destination address 168 (e.g., a local address within the tunnel 178) for the identified node 154. The node 152 may then transmit the local transmission request 164 to the node 154, which may receive the packet 118C, successfully completing communication requested by the node 108 of the cluster 102.

In certain implementations, the gateway nodes 106, 152 may be responsible for creating the tunnels 155, 178 within the cluster. For example, when clusters 102, 104 are initialized, the gateway nodes 106, 152 may create the tunnels 144, 178 by reserving a particular subset of addresses for use in tunneled communications within the network 142. As each node 108, 154 is instantiated within the cluster 102, the gateway nodes 106, 152 may further assign addresses (e.g., local addresses 110, 128) to the nodes 106, 152. In particular, the nodes 106, 152 may be assigned local addresses 110, 128 for communication within the networks 142, 176 and within the tunnels 144, 178. Gateway nodes 106, 152 may also be responsible for connecting to and/or creating the external tunnel 148. For example, upon connecting to the network 146, the gateway nodes 106 may be configured to determine whether a tunnel 148 within the network 146 has been created. If a tunnel 148 already exists, the gateway nodes 106, 152 may connect to the tunnel and may be assigned public addresses 130, 172 within the network 146 and the tunnel 148 (e.g., from a gateway node or other networking service responsible for maintaining addresses within the network 146 and the tunnel 148). If, however, a tunnel does not exist, the gateway node 106, 152 may create the tunnel 148 and may assign public addresses (e.g., public tunnel addresses) to new gateway nodes as they connect to the network 146 and the tunnel 148.

In certain implementations, the tunnels 144, 148, 178 may be implemented using specific address spaces for transmissions via the tunnels 144, 148, 178. In such instances, transmissions via the tunnels may include local transmissions requests 112, 164 and/or external transmission requests 126 specifying source addresses 114, 138, 166 and destination addresses 116, 140, 168 within the address spaces of the corresponding tunnels 144, 148, 178, as described above. However, in further implementations, the tunnels 144, 148, 178 may not utilize separate address spaces. In such instances, rather than utilizing separate local transmission requests and external transmission requests, the packet 118A-C may be transmitted and routed within the tunnels based on the source address 120 and the destination address 122.

In the above-discussed examples, it should be understood that the clusters 102, 104 may be located in the same geographical location (e.g., the same computing facility, the same city, the same state) and/or may be located in different geographical locations. For example, the clusters 102, 104 may be located in different data facilities, different cities, different states, and/or different countries. Additionally, although the clusters 102, 104 are each depicted as containing two nodes 106, 108, 152, 154, it should be understood that the clusters 102, 104 may, in practice, have more nodes. For example, the clusters 102, 104 may have tens, hundreds, or thousands of nodes and the nodes may themselves execute multiple work units. Furthermore, although each cluster 102, 104 is described as having a single gateway node 106, 152 in communication with the network 146, in certain implementations, the clusters may have more than one gateway node connected to the network 146.

Also, although not depicted, the clusters 102, 104 and/or the nodes 106, 108, 152, 154 may contain a processor and/or a memory configured to implement one or more features of the clusters 102, 104 and/or the nodes 106, 108, 152, 154. For example, the memory may contain instructions which, when executed by the processor, may cause the processor to implement one or more features of the clusters 102, 104 and/or the nodes 106, 108, 152, 154.

Figure 2:
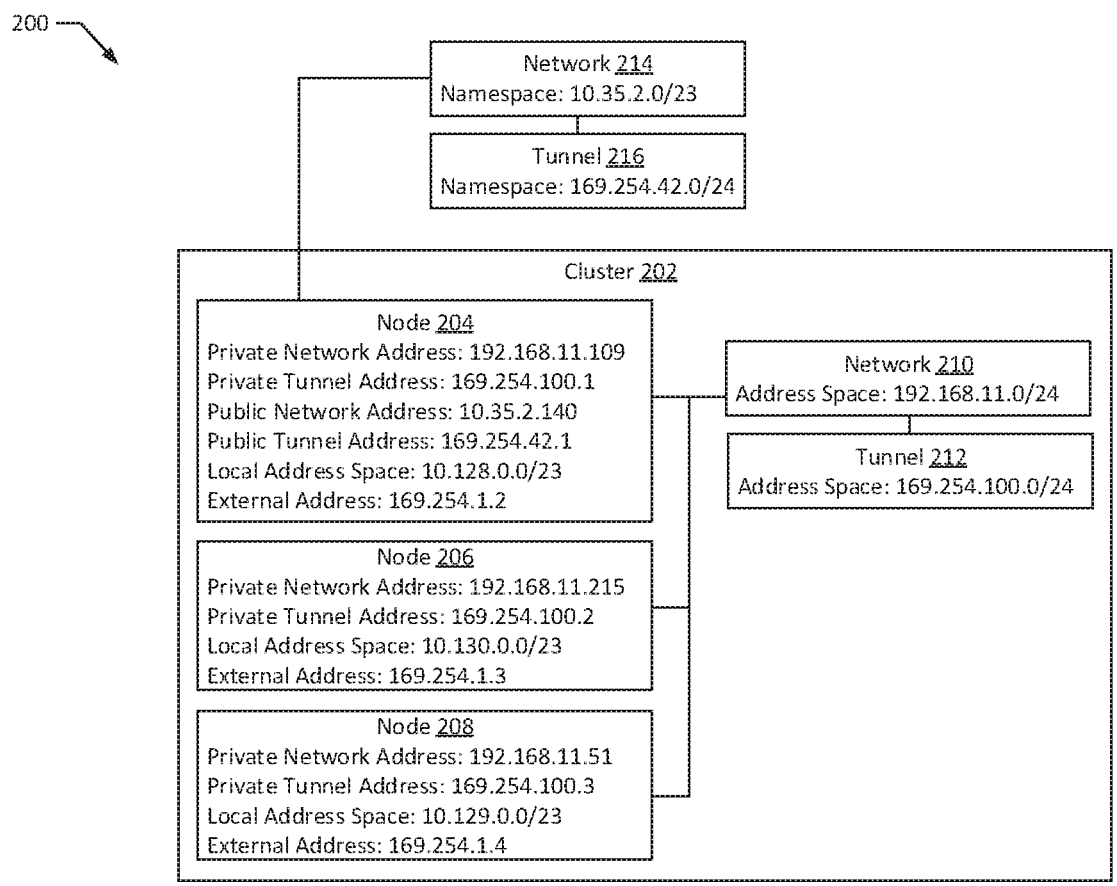
FIG. 2 illustrates an allocation of addresses according to an exemplary embodiment of the present disclosure.

FIG. 2 illustrates an allocation 200 of addresses according to an exemplary embodiment of the present disclosure. The allocation 200 and be an exemplary implementation of addresses and address spaces assigned to nodes such as the nodes 106, 108, 152, 154 within the clusters 102, 104. In particular, the allocation 200 includes a cluster 202 and nodes 204, 206, 208, which may respectively be exemplary implementations of the clusters 102, 104 and/or the nodes 106, 108, 152, 154. Similarly, the allocation 200 includes a network 210 and a tunnel 212, which may be an exemplary implementation of the local networks 142, 176 and the tunnels 144, 178. Furthermore, the allocation 200 includes a network 214 and a tunnel 216, which may be exemplary implementations of the network 146 and the tunnel 148.

In the allocation 200, the network 210 connects the nodes 204, 206, 208. In particular, the nodes 204, 206, 208 may communicate via the network 210 using a tunnel, such as the tunnel 212. As discussed above, the tunnel 212 may be implemented using one or more security and/or unsecured tunneling protocols. The node 204 is further connected to the network 214. The node 204 may be configured as a gateway node and may be responsible for communicating with nodes located in other clusters. In particular, the node 204 may communicate with nodes located in other clusters via the tunnel 216, which may be implemented using one or more secured and/or unsecured tunneling protocols.

Each of the networks 210, 214 and the tunnels 212, 216 include an address space (e.g., a collection or range of valid addresses). In particular, the network 210 has an address space of 192.168.11.0/24, the network 214 has an address space of 10.35.2.0/23, the tunnel has an address space of 169.254.100.0/24, and the tunnel has an address space of 169.254.42.0/24. Addresses within the networks 210, 214 in the tunnels 212, 216 may be assigned from within the address space of the networks 210, 214 and the tunnels 212, 216, as explained further below. The nodes 204, 206, 208 include private network addresses and private tunnel addresses. The private network addresses and private tunnel addresses may be exemplary implementations of the local addresses 110, 128, 170, 174 discussed above. The private network addresses may be configured to uniquely identify the nodes 204, 206, 208 within the network 210 (e.g., for communications occurring directly via the network 210). The private tunnel addresses may be configured to uniquely identify the nodes 204, 206, 208 within the tunnel 212. As explained above, the private network addresses may be assigned to the nodes 204, 206, 208 from within the address space of the network 210. For example, the private network addresses of the nodes 204, 206, 208 are 192.168.11.102, 192.168.11.216, and 192.168.11.51, respectively, which all occur within the address space of the network 210 of 192.168.11.0/24. Similarly, the private tunnel addresses may be assigned to the nodes 204, 206, 208 from within the address space of the tunnel 212. For example, the private tunnel addresses of the nodes 204, 206, 208 are 169.254.100.1, 169.254.100.2, and 169.254.100.3, which all occur within the address space of the tunnel 212 of 169.254.100.0/24.

The node 204 also includes a public network address and a public tunnel address, which may be exemplary implementations of the public addresses 130, 172. The public network address may be configured to uniquely identify the node 204 within the network 214 (e.g., for communications occurring directly via the network 214). The public tunnel address may be configured to uniquely identify the node 204 for communications occurring via the tunnel 216. As explained above, the public network address may be assigned to the node 204 from within the address space of the network 214. For example, the public network address of the node 204 is 10.35.2.140, which occurs within the address space of the network 214 of 10.35.2.0/23. Similarly, the public tunnel address may be assigned to the node 204 from within the address space of the tunnel 216. For example, the public tall address of the node 204 is 169.254.42.1, which occurs within the address space of the tunnel 216 of 169.254.42.0/24.

The nodes 204, 206, 208 also include external addresses. The external addresses may be used to uniquely identify the nodes 204, 206, 208 within a larger external address space. For example, the external addresses may be assigned from a global address space, which may be created to facilitate communication between and unique identification of nodes within multiple clusters. In particular, the global address space may be created by a routing agent within a cluster and/or within a central routing process (e.g., a central routing process executing within a cluster). In creating the global address space, particular subsets of the address space (e.g., subnets of addresses) may be assigned to individual clusters and specific external addresses may be assigned to nodes within the clusters (e.g., by a routing agent and/or gateway node of the clusters) from within the assigned subset of the address space. As a specific example, the cluster 202 may be assigned a subnet of 169.254.1.0/24. As depicted, the external addresses of the nodes 204, 206, 208 may be assigned from within the subnet as, respectively, 169.254.1.2, 169.254.1.3, and 169.254.1.4.

The nodes 204, 206, 208 also include a local address space, which may be assigned as a unique identifier of the nodes 204, 206, 208 upon creation of the nodes. In particular, the local address space may be used to uniquely identify work units executing within the nodes 204, 206, 208. In particular, addresses may be assigned to new work units upon creation within the nodes 204, 206, 208 from within the local address space of the nodes 204, 206, 208. As depicted, the local address space of the node 204 is 10.128.0.0/23, the local address space of the node 206 is 10.130.0.0/23, and the local address space of the node 208 is 10.129.0.0/23. As a specific example, a work unit executing within the node 208 (e.g., a pod or service) may be assigned an address of 10.129.0.31. In certain implementations, different types of work units may have different local address spaces. For example, the nodes 204, 206, 208 may have separate local address spaces for pods and services. Additionally, in certain implementations, work units (e.g., pods and services) executing on the nodes 204, 206, 208 may be assigned an external address similar to the nodes 204, 206, 208.

In certain implementations, one or more of the above discussed addresses may be optional. For example, in certain implementations, communications within the cluster 202 may occur directly via the network 210, which may not include a tunnel 212. In such instances, the private tunnel addresses of the nodes 204, 206, 208 may be omitted. Additionally or alternatively, certain implementations may not utilize the global address space (e.g., because nodes within different clusters do not include overlapping address spaces, such as overlapping local address spaces). Accordingly, in such implementations, the external addresses of the nodes 204, 206, 208 may be omitted. It should also be understood that the depicted and discussed address spaces and addresses are merely exemplary implementations and other addresses and/or address spaces may be used to assign and allocate addresses to nodes and work units within clusters.

Figure 3:
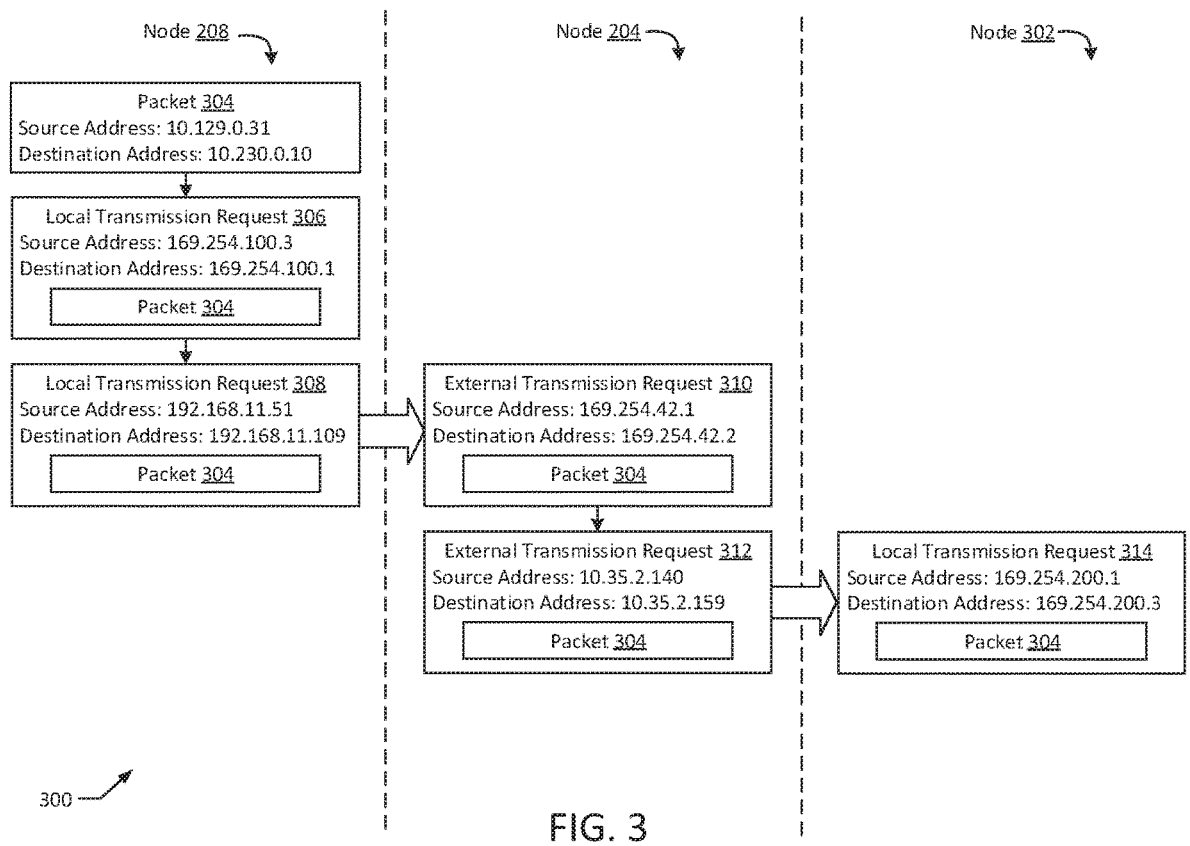
FIG. 3 illustrates a flow diagram of communication between nodes according to an exemplary embodiment of the present disclosure.

FIG. 3 illustrates a flow diagram 300 of communication between nodes according to an exemplary embodiment of the present disclosure. The flow diagram 300 includes the nodes 204, 208 and a node 302. The nodes 204, 208 may be exemplary instances of the nodes 204, 208 within the allocation 200. In particular, the nodes 204, 208 may have the same assigned addresses as those discussed above in connection with the allocation 200. The node 302 may be implemented similarly to the nodes 204, 208 and may be part of a computing cluster different from the cluster 202. Accordingly, one or more of the addresses assigned to the node 302 may differ from those assigned to the nodes 204, 208. In particular, the node 302 may be an exemplary implementation of a gateway node and the private network address, private tunnel address, public network address, public tunnel address, and/or external address may differ from those assigned to the gateway node 204.

The flow diagram 300 begins with the creation of a packet 304. As explained above, the packet 304 includes a source address identifying the node or work unit that created the packet and a destination address identifying a node or work unit to which the packet 304 is being transmitted. Although not depicted, the packet 304 may further include data for transmission. As depicted, the source address of the packet 304 is 10.129.0.31, identifying a work unit (e.g., a pod or service) executing on the node 208 that created the packet 304. Additionally, the destination address of the packet 304 is 10.230.0.10, which may identify the work unit to which the packet 304 is being transmitted. In particular, the destination address may correspond to a process executing on a node in a different cluster (e.g., in the same cluster as the node 302). Accordingly, the packet 304 may need to be transmitted from the cluster 202 to another cluster.

To transmit the packet 304, the node 208 may create a local transmission request 306. The local transmission request 306 include the packet 304, a source address, and a destination address. The source address of the local transmission request 306 may be a local address of the node 208 and/or the work unit that created the packet 304. In particular, the source address is 169.254.100.3, the private tunnel address for the node 208. The destination address of the local transmission request 306 may be a local address of the gateway node 204 of the cluster 202. In particular, the destination address is 169.254.100.1, the private tunnel address of the node 204. By utilizing the private tunnel addresses, the local transmission request 306 may be able to be transmitted from the node 208 to the node 204 using the local tunnel 212 within the cluster 202, improving both address compatibility and security of the transmission (e.g., because the tunnel 212 utilizes its own address space, because the tunnel 212 may be secured, and because the addresses within the packet 304 are not altered).

When transmitting the local transmission request 306 utilizing the tunnel 212, another local transmission request 308 is prepared with updated source and destination addresses. In particular, the source and destination addresses may be updated to the private network addresses of the nodes 208, 204, respectively. The source and destination addresses may be updated to the private network addresses to enable the local transmission request 308 to be properly routed within the network 210. In particular, the local transmission request 308 may be prepared according to the tunneling protocol implementing the tunnel 212. For example, where the tunnel 212 is implemented using a secured tunnel, the packet 304 may be encrypted in the local transmission request 308.

The local transmission request 308 may then be transmitted to the node 204 via the network 210. The node 204 may then create an external request 310. The external transmission request 310 may be prepared to transmit the packet 304 using the tunnel 216. In particular, the external transmission request 310 may be configured to include a source address identifying the node 204 sending external transmission request 310 and the destination address identifying the node 302 to which the external transmission request 310 is being sent via the tunnel 216. In particular, the node 302 may be identified as the gateway node for a cluster containing the process corresponding to the destination address within the packet 304. To identify the node 302, a routing agent within the node 204 may identify the cluster implementing the destination address. Example, as described above, the routing agent may consult a database of addresses assigned to processes executing within various clusters connected to the network 214. The routing agent may request or otherwise query a cluster corresponding to the destination address within the packet 304. In response, the routing agent may receive a public address (e.g., a public tunnel address, a public network address, and/or an external address) for the gateway node 302 of the cluster executing the receiving process. The node 204 may then determine a public tunnel address for the node 302 (e.g., where a public tunnel address is not received from the database). For example, the routing agent may store otherwise access a mapping or other repository between other types of public addresses (e.g., public network addresses, external addresses) and public tunnel addresses using the tunnel 216.

When transmitting the external transmission request 310 via the tunnel 216, another external transmission request 312 is prepared with updated source and destination addresses. In particular, the updated external transmission request through into may include source and destination addresses identifying public network addresses of the nodes 204, 302, respectively. To create the external transmission request 312, a routing agent of the node 204 may determine the local network addresses based on the public tunnel addresses included within the external transmission request 310. For example, the routing agent may determine the public network addresses by consulting a mapping or other repository of public network and tunnel addresses for gateway nodes 204, 302 connected to the network 214.

The external transmission request 312 may then be transmitted to the node 302 via the network 214. The node 302 may then create a local transmission request 314 based on the external transmission request 312 received from the node 204. The local transmission request 314 may include a copy of the packet 304. The local transmission request 314 also includes a source address identifying the node 302 and a destination address of the node implementing the work unit corresponding to the destination address of the packet 304. In particular, the source address and the destination address of the local transmission request 314 may be identified as local tunnel addresses of the node 302 (i.e., 169.254.200.1) and the node implementing the work unit (i.e., 169.254.200.3). The destination address of the local transmission request 314 may be identified by a routing agent of the node 302. For example, the routing agent of the node 302 may extract the destination address from the packet 304 and may identify a corresponding local tunnel address (e.g., in a mapping or other repository of the routing agent).

The local transmission request 314 may then be transmitted to the node implementing the work unit to which the packet 304 is transmitted. For example, the local transmission request may be transmitted to the node using techniques similar to those for the local transmission request 308. In particular, an updated local transmission request may be generated that replaces the local tunnel addresses for the source and destination addresses with local network addresses and may transmit the updated local transmission request to the node using a local network of the cluster containing the node 302.

The techniques of the flow diagram 300 may enable tunnel-based communication between nodes within a cluster, while also allowing for tunnel-based communication with nodes in different clusters. In particular, the techniques of the flow diagram 300 may enable the use of tunnel-based communication between nodes while still utilizing other, more conventional types of addresses (e.g., public network addresses, private network addresses). As a specific example, the techniques of the flow diagram 300 may not alter the contents of the packet and may therefore maintain the source and destination addresses of the packet 304 (e.g., by using the local tunnel 212 and the local and external transmission requests). Accordingly, these techniques maintain compatibility with existing networking infrastructure while also allowing for tunnel-based communication. As explained above, using tunnels to communicate between nodes in different clusters may enable the direct connection and communication between different clusters. Furthermore, certain tunnel implementations may use of a separate address space for communications via the tunnels, which may avoid overlap of addresses between different nodes, reducing the erroneous routing of packets. Furthermore, because the tunnels can be secured if desired, tunnel-based communication between nodes may improve security of communication between the nodes, especially for communications between different clusters that occur via public networks such as the internet.

Figure 4:
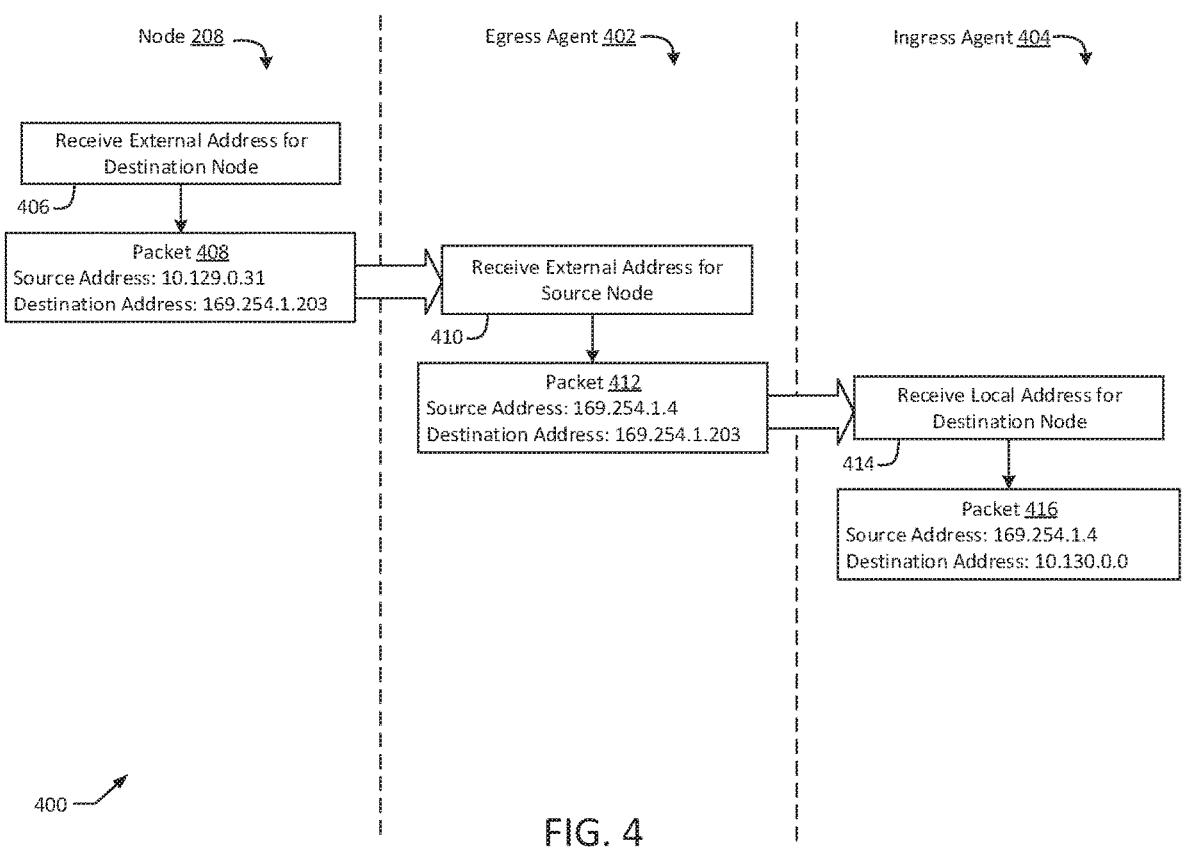
FIG. 4 illustrates a flow diagram of communication from a node according to an exemplary embodiment of the present disclosure.

FIG. 4 illustrates a flow diagram 400 of communication from a node according to an exemplary embodiment of the present disclosure. The flow diagram 400 includes a node 208, which may be an exemplary instance of the nodes 208 within the allocation 200. In particular, the nodes 204, 208 may have the same assigned addresses as those discussed above in connection with the allocation 200. The flow diagram 400 also includes an egress agent 402 and an ingress agent 404. The egress agent 402 and the ingress agent 404 may be exemplary implementations of the egress agents 134, 160 and the ingress agents 132, 158. For example, the egress agent 402 and the ingress agent 404 may be implemented as work units within gateway nodes, such as the node 204. In particular, the egress agent 402 may be the egress agent for the gateway node 204 of the cluster 202 containing the node 208. Further, the ingress agent 404 may be an ingress agent for a gateway node in a different cluster (e.g., the node 302). Additionally or alternatively, the egress agent and/or the ingress agent may be implemented in a separate node of the cluster 202 and/or in a separate cluster connected to the network 214.

The flow diagram 400 begins with receiving an external address for a destination node (block 406). For example, the external address may identify a node or work unit within a cluster other than the cluster 202. The destination address may be received from a work unit executing on the node 208 (e.g., a work unit requesting transmission of data to the destination work unit). Additionally or alternatively, the external address may be received from a user of a work unit executing on the node 208. The external address may be assigned to the destination node from within a global address space, as discussed above. In particular, the external address may be configured to uniquely identify the destination node within the global address space. As a specific example, the destination address is 169.254.1.203. As explained with the allocation 200, the cluster 202 may be assigned a subnet of 169.254.1.0/23. Accordingly, the external addresses for the nodes 204, 206, 208 are allocated from within this subnet of the global address space (e.g., 169.254.1.2, 169.254.1.3, 169.254.1.4). In the depicted example, the destination node or work unit may be assigned to a cluster that is assigned a subnet of 169.254.1.200/23, so the destination work unit may be assigned the external address of 169.254.1.203. The node 208 may then create a packet 408 that includes the destination address identifying the destination work unit and a source address identifying the work unit executing on the node 208. In particular, the packet 408 may be created to include a local address of a work unit requesting the creation and/or transmission of the packet 408, similar to the source address of the packet 304 discussed above.

The packet 408 may then be transmitted to the egress agent 402. For example, the packet 408 may be transmitted to the egress agent 402 via a local network 210 and/or a local tunnel 212 within the cluster 202. In particular, the packet 408 may be transmitted to the egress agent 402 using techniques (e.g., external and/or local transmission requests) discussed above in connection with the flow diagram 300. The egress agent 402 may then receive an external address for the source node (block 410). For example, after receiving the packet 408, the egress agent 402 may extract the source address from the packet 408. The egress agent 402 may determine an external address for the source work unit by, e.g., requesting an external address from a repository or other mapping between private addresses of the node 208 (and/or work units executing therein) and external addresses assigned from a global address space. After receiving the external address, the egress agent 402 may update packet 412 to include the external address of the source work unit. For example, as depicted, the packet 412 is created to include the source address of 169.254.1.4, which is the external address of the node 208.

The packet 412 may then be transmitted to the ingress agent 404. In particular, the packet 412 may be transmitted to the ingress agent 404 via the tunnel 216 and/or the network 214. For example, the packet 412 may be transmitted to the ingress agent 404 using techniques (e.g., external transmission requests) discussed above in connection with the flow diagram 300. The ingress agent 404 may receive a local address for the destination node (block 414). For example, after receiving the packet 412, the ingress agent 404 may extract the destination address from the packet 412 and may determine a local address corresponding to the destination address. For example, the ingress agent 404 may determine or receive the local address for the destination node (and/or work units executing therein) from a repository or other mapping between private addresses of nodes within the same cluster as the ingress agent 404 and external addresses. After receiving the local address, the ingress agent 404 may update the packet 416 to include the received local address of the destination address (e.g., of the destination work unit). For example, as depicted, packet 416 includes a destination address of 10.130.0.0. The packet 416 may then be transmitted to the destination work unit using techniques similar to those discussed above in connection with the flow diagram 300 (e.g., using local transmission requests).

Performing techniques such as those depicted in the flow diagram 400 may enable the use of a global address space while transmitting packets of data between nodes and work units within different computing clusters. As explained above, the global address space may include subnets of different addresses allocated to each cluster, preventing the issue of overlapping addresses causing packets to be routed incorrectly. Accordingly, these techniques improve the reliability and simplicity of such communications. Furthermore, these techniques work with existing packet structures, as illustrated in the packets 408, 412, 416 at each stage in the transmission procedure. Accordingly, these techniques do not require the replacement of existing network features and packet structures within and between computing clusters. Furthermore, as discussed above, the egress agent 402 and the ingress agent 404 may be flexibly implemented. In particular, the egress agent 402 and the ingress agent 404 may be executed within a routing agent of a gateway node, may be executed within a centralized cluster responsible for routing communications between different computing clusters, and/or by a work unit that intercepts communications to or from clusters. This flexibility allows the techniques of the flow diagram 400 to be implemented using system architectures that are most compatible and/or sensible in the light of existing computing cluster deployments, improving compatibility of the techniques with existing systems.

In certain implementations, the techniques of the flow diagram 400 may be implemented in combination with and/or independently from the techniques of the flow diagram 300. For example, as discussed above, the techniques of the flow diagram 400 may be performed at least in part using local transmission requests and/or external transmission requests. Furthermore, the techniques of the flow diagram 400 may be performed using tunnels 212, 216 (e.g., by utilizing private and public tunnel addresses in the packet 408, 412, 416 and/or the local or external transmission requests). However, in further implementations, the techniques of the flow diagram 400 may be implemented without using tunnels 212, 216 or using tunnels that do not have a separate address space. In such implementations, local and/or external transmission requests may not be necessary.

Figure 5:
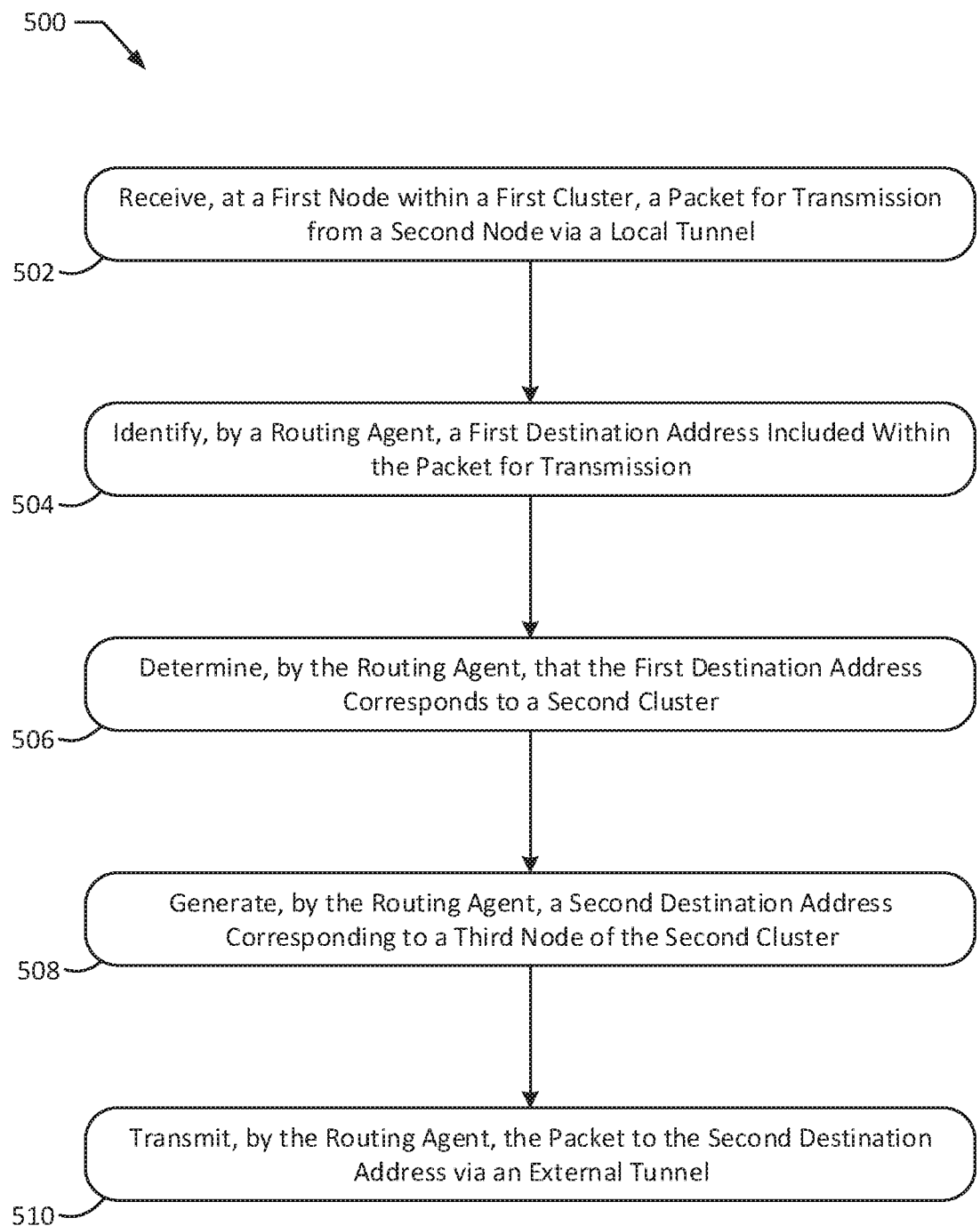
FIG. 5 illustrates a method for tunnel-based computing cluster communication according to an exemplary embodiment of the present disclosure.

FIG. 5 illustrates a method 500 for tunnel-based computing cluster communication according to an exemplary embodiment of the present disclosure. The method 500 may be performed to transmit data (e.g., packets) from a node in one cluster to a node in another cluster. The method 500 may be implemented on a computer system, such as the system 100. For example, the method 500 may be implemented by the clusters 102, 104 and/or the nodes 106, 108, 152, 154. The method 500 may also be implemented by a set of instructions stored on a computer-readable medium that, when executed by a processor, cause the computer system to perform the method 500. For example, all or part of the method 500 may be implemented by a processor and/or a memory of the clusters 102, 104 and/or the nodes 106, 108, 152, 154. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving, at a first node within a first cluster, a packet for transmission from a second node via a local tunnel (block 502). For example, a node 106 within the cluster 102 may receive, from another node 108 (or a work unit executing on another node 108) within the cluster 102, a packet 118A for transmission. In particular, the node 106 may receive the packet 118A via a local tunnel 144 within a local network 142 of the cluster 102. As explained further above, the packet 118A be received via a local transmission request 112. As also explained above, the packet 118A may be received via a local transmission request 112, which is used to transmit the packet 118A via the tunnel 144. In particular, the local transmission request 112 may include a source address 114 identifying the node 108 or transmitting work unit (e.g., a local address 110 of the node 108 or transmitting work unit) and a destination address 116 identifying the node 106 or receiving work unit (e.g., a local address 128 of the node 106 or receiving work unit).

A routing agent may identify a first destination address included within the packet for transmission (block 504). For example, the node 106 that received the packet 118A at block 502 may include a routing agent 124. The routing agent 124 may be configured to identify a first destination address included within the packet 118A. The packet 118A may include a source address 120 identifying the node 108 or transmitting work unit and a destination address 122 identifying the node 154 or work unit to which the packet 118A is to be transmitted. The routing agent 124 may identify the first destination address as the destination address 122 included within the packet 118A. In certain implementations (e.g., as discussed above in connection with the flow diagram 300), the destination address in the packet 118A may be a local address of the node or work unit to which the packet 118A is to be transmitted. In further implementations (e.g., as discussed above in connection with the flow diagram 400), the destination address in the packet 118A may be an external address of the node or work unit to which the packet 118A is to be transmitted.

The routing agent may then determine that the first destination address corresponds to a second cluster (block 506). For example, the routing agent 124 may determine that the destination address 122 corresponds to a second cluster 104. In particular, the routing agent 124 may compare the destination address 122 to addresses (e.g., local addresses, external addresses) associated with other computing clusters. The second cluster may be identified as a computing cluster that includes a node or work unit with the same address as the destination address 122. As a specific example, the routing agent 124 may determine that the destination address 122 in the packet 118A corresponds to the node 154 (e.g., to a work unit executing on the node 154). Because the cluster 104 contains the node 154, the cluster 104 may be identified as the second cluster.

The routing agent may generate a second destination address corresponding to a third node of the second cluster (block 508). For example, the routing agent 124 may generate a second destination address 140 corresponding to a third node 152 of the second cluster 104. In particular, the third node may be identified as a gateway node of the second cluster 104. For example, after identifying the second cluster in the block 506, the routing agent 124 may identify the gateway node for the second cluster 104. For example, the mapping or repository utilized to determine that the first destination address corresponds to the second cluster may additionally contain identifying information regarding addresses (e.g., public addresses) for gateway nodes of particular clusters. Accordingly, to generate the second destination address 140, the routing agent 124 may extract the public address (e.g., an external address, a public tunnel address, a public network address) of the third node 152.

The routing agent may then transmit the packet to the second destination address via an external tunnel (block 510). For example, the routing agent 124 may transmit the packet 118B to the second destination address 140 via an external tunnel 148. In particular, to transmit the packet 118B, the node 106 may generate an external transmission request 126 containing the destination address 140 and/or the packet 118B for transmission. The external transmission request 126 may additionally contain a source address 138 identifying the node 106. For example, the source address 138 may be a public address identifying the node 106 (e.g., the same type of public address as the destination address 140). In certain implementations, when transmitting the packet 118B, the routing agent 124 may update all or part of the packet 118B. For example, the routing agent 124 may update the source address 120 to include an external address of the node 108.

Figure 6:
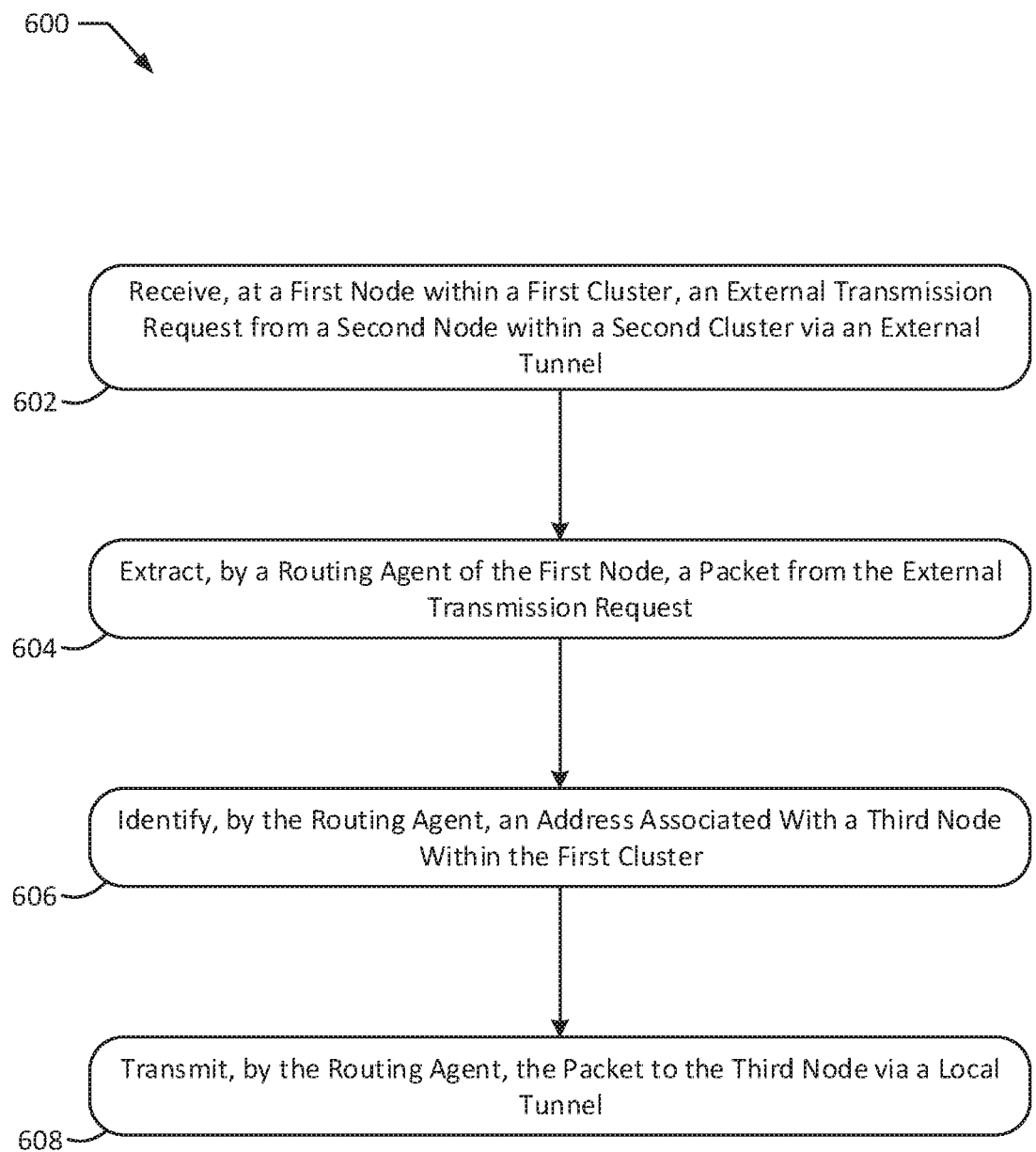
FIG. 6 illustrates a method for tunnel-based computing cluster communication according to an exemplary embodiment of the present disclosure.

FIG. 6 illustrates a method 600 for tunnel-based computing cluster communication according to an exemplary embodiment of the present disclosure. The method 600 may be performed to transmit packets received at a computing cluster from external nodes or clusters to particular nodes or work units within the computing cluster. For example, the method 600 may be performed by the routing agent 156 upon receiving external networking requests. The method 600 may be implemented on a computer system, such as the system 100. For example, the method 600 may be implemented by the clusters 102, 104 and/or the nodes 106, 108, 152, 154. The method 600 may also be implemented by a set of instructions stored on a computer-readable medium that, when executed by a processor, cause the computer system to perform the method 600. For example, all or part of the method 600 may be implemented by a processor and/or a memory of the clusters 102, 104 and/or the nodes 106, 108, 152, 154. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving, at a first node within a first cluster, and external transmission request from a second node within a second cluster via an external tunnel (block 602). For example, a node 152 (e.g., a gateway node) within a cluster 104 may receive, from a node 106 (e.g., a gateway node) within a cluster 102, and external transmission request 126 via an external tunnel 148 of an external network 146 connecting the cluster 104 to other clusters. For example, the method 600 may begin after the node 106 transmits the external transmission request 126 a block 510 method 500.

A routing agent of the first node may extract a packet from the external transmission request (block 604). For example, the node 152 that received the external transmission request 126 may include a routing agent 156. The routing agent 156 may extract a packet 118B from the external transmission request 126.

The routing agent may identify an address associated with the third node within the first cluster (block 606). For example, the routing agent 156 may identify an address associated with another node 154 (e.g., a work unit executing on the node 154) within the cluster 104. In particular, the packet 118B may include source address 120 and a destination address 122. The destination address 122 may identify a final destination node or work unit for the packet 118B. The destination address 122 may include a public address or a private address of a node or work unit to which the packet 118B is being transmitted. In instances where the destination address 122 indicates a private address of a node 154 within the cluster 104, the node 154 may be identified as the third node. In instances where the destination address indicates a public address of a node 154, the routing agent 156 may determine a private address for the node 154, as discussed above. In implementations where the destination address 122 is the address of a work unit executing within a node 154 of the cluster 104, the routing agent 156 may determine which node in the cluster 104 is executing the work unit. For example, each node in the cluster 104 may be allocated a particular local address space, and the node 154 executing the process may be identified as the node allocated to the local address space to which the destination address 122 belongs. As a specific example, and referring to the allocation 200, if the destination address for the work unit is 10.129.0.1, the node 208 may be identified as the third node because the destination address 122 occurs within the local address space of the node 208 (e.g., 10.129.0.0/23).

The routing agent may transmit the packet to the third node via a local tunnel (block 608). For example, the routing agent 156 may transmit the packet 118C to the third node 154 by a local tunnel 178 of the local network 176 within the cluster 104. In particular, routing agent 156 and/or the node 152 may create a local transmission request 164 containing the packet 118C. Local transmission request 164 may also contain a source address 166 identifying the node 152 (e.g., a local address 170 of the node 152, an external address of the node 152) and a destination address 168 identifying the node 154 (e.g., a local address 174 of the node 154) to which the packet 118C is being transmitted. In particular, to transmit the local transmission request 164 via the local tunnel 178, the source address 166 may be a private tunnel address of the node 152 and the destination address 168 may be a private tunnel address of the node 154. The local transmission request 164 may then be transmitted to the node 154 (e.g., using techniques similar to those discussed above in connection with the flow diagram 300). Upon receiving the local transmission request 164, the node 154 or work unit may extract the packet 118C and any data contained therein. Accordingly, the method 600 results in the successful transmission of the packet 118C to its destination node 154 or work unit.

The methods 500, 600 may enable the use of tunnels to communicate between nodes and work units in different clusters. In particular, the methods 500, 600 may be used to combine both local and external tunnels for clusters, allowing for the benefits of tunnel-based communication without having to directly connect additional nodes of the computing clusters beyond the gateway nodes to any external networks. Furthermore, because the communications may utilize tunnels, separate address spaces may be used (e.g., separate private tunnel addresses and public tunnel addresses) for communication between nodes in different computing clusters, reducing the risk of address space and/or address overlaps. Accordingly, the methods 500, 600 improves the reliability of communication between nodes in different computing clusters. Additionally, because the tunnels may be secured in certain implementations, the methods 500, 600 may also improve the security of communications between nodes on different computing clusters. Also, in certain implementations, the addresses contained within the packets may not be altered, improving compatibility with existing network deployments. Alternatively, external addresses may be used for the nodes, pods, and/or services, which may ensure that addresses for nodes on different clusters do not overlap.

Figure 7:
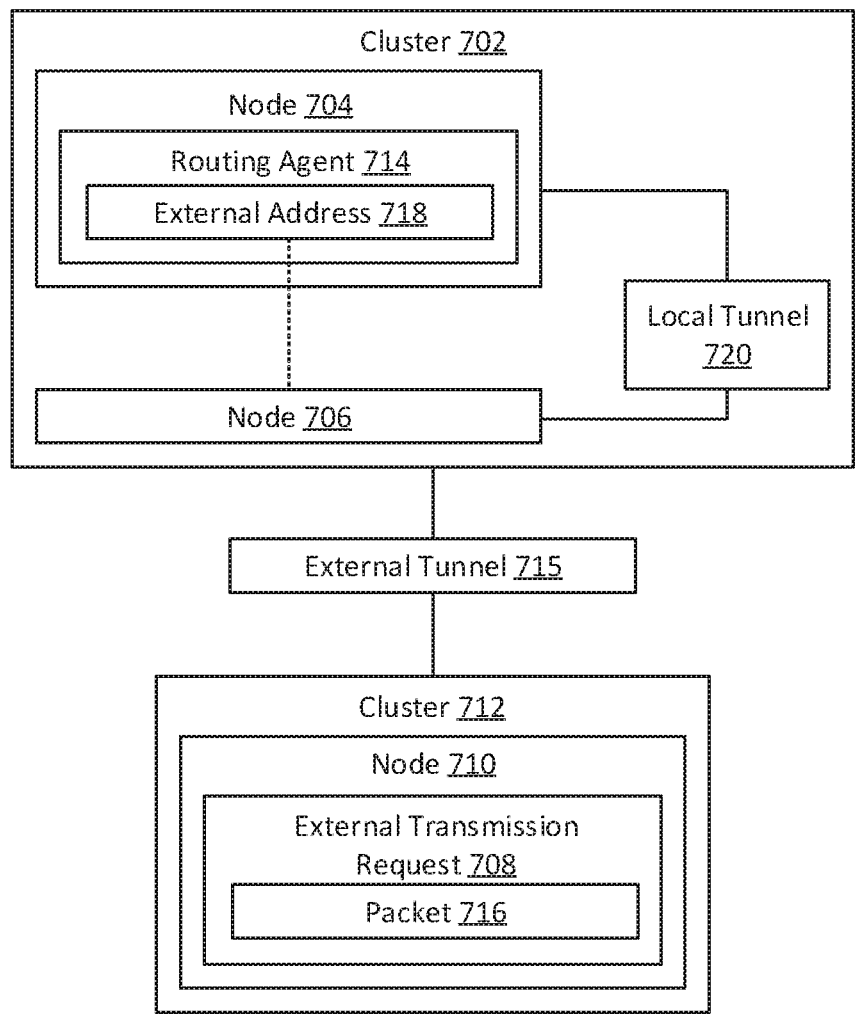
FIG. 7 illustrates a system according to an exemplary embodiment of the present disclosure.

FIG. 7 illustrates a system 700 according to an exemplary embodiment of the present disclosure. The system 700 may include a first cluster 702 containing a first node 704 and a second node 706, the first node 704 configured to receive an external transmission request 708 from a third node 710 within a second cluster 712, the external transmission request received via an external tunnel 715 between a plurality of clusters 702, 712 including the first cluster 702 and the second cluster 712. The first node 704 includes a routing agent 714 configured to extract a packet 716 from the external transmission request 708 and identify an external address 718 associated with the second node 706. The routing agent 714 may also be configured to transmit the packet 716 to the second node 706 via a local tunnel 720 of the first cluster 702.

Aspects of the subject matter described herein may be useful alone or in combination with one or more aspects described herein. In a first aspect, a method is provided that includes receiving, at a first node within a first cluster, a packet for transmission from a second node within the first cluster, the packet for transmission received via a local tunnel of the first cluster. The method may also include identifying, by a routing agent of the first node, a first destination address included within the packet for transmission and determining, by the routing agent, that the first destination address corresponds to a second cluster. The method may further include generating, by the routing agent, a second destination address corresponding to a third node of the second cluster and transmitting, by the routing agent, the packet to the second destination address via an external tunnel between a plurality of clusters including the first cluster and the second cluster.

In a second aspect according to any of the previous aspects (e.g., the first aspect), the method further includes, at the second node, creating the packet for transmission including a first external address associated with the second node and a second external address associated with the third node. The method may further include creating a local transmission request including the packet for transmission, a first private address of the first node, and a second private address of the second node and transmitting the local transmission request to the first node via the local tunnel.

In a third aspect according to any of the previous aspects (e.g., the second aspect), identifying the first destination address includes extracting the packet for transmission from the local transmission request and identifying the second external address as the first destination address.

In a fourth aspect according to any of the previous aspects (e.g., the third aspect), generating the second destination address includes determining a first public address associated with the third node.

In a fifth aspect according to any of the previous aspects (e.g., the fourth aspect), the first public address is an address of the third node within the external tunnel.

In a sixth aspect according to any of the previous aspects (e.g., the fourth aspect), transmitting the packet includes creating an external transmission request including the packet for transmission, the first public address, and a second public address associated with the first node and transmitting the external transmission request to the second cluster via the external tunnel.

In a seventh aspect according to any of the previous aspects (e.g., the second aspect), the first external address is selected from a first subnet of external addresses assigned to the first cluster, and the second external address may be selected from a second subnet of external addresses assigned to the second cluster.

In an eighth aspect according to any of the previous aspects (e.g., the second aspect), the first and second private addresses are respectively addresses of the first and second nodes within the local tunnel.

In a ninth aspect according to any of the previous aspects (e.g., the first aspect), the first node is a gateway node of the first cluster and the second node is at least one of a pod executing within the first cluster and a service executing within the first cluster.

In a tenth aspect according to any of the previous aspects (e.g., the first aspect), the local tunnel executes on a local network between a plurality of nodes within the first cluster, which may include the first node and the second node.

In an eleventh aspect according to any of the previous aspects (e.g., the first aspect), the external tunnel executes on a public network between the plurality of clusters.

In a twelfth aspect, a system is provided including a first cluster containing a first node and a second node, the first node configured to receive a packet for transmission from the second node, the packet for transmission received via a local tunnel of the first cluster. The first node may include a routing agent configured to identify a first destination address included within the packet for transmission, determine that the first destination address corresponds to a second cluster, and generate a second destination address corresponding to a third node of the second cluster. The routing agent may be further configured to transmit the packet to the second destination address via an external tunnel between a plurality of clusters including the first cluster and the second cluster.

In a thirteenth aspect according to any of the previous aspects (e.g., the twelfth aspects, the second node is configured to create the packet for transmission including a first external address associated with the second node and a second external address associated with the third node. The second node may be further configured to create a local transmission request including the packet for transmission, a first private address of the first node, and a second private address of the second node and transmit the local transmission request to the first node via the local tunnel.

In a fourteenth aspect according to any of the previous aspects (e.g., the thirteenth aspect), identifying the first destination address includes extracting the packet for transmission from the local transmission request and identifying the second external address as the first destination address.

In a fifteenth aspect according to any of the previous aspects (e.g., the fourteenth aspect), generating the second destination address includes determining a first public address associated with the third node.

In a sixteenth aspect according to any of the previous aspects (e.g., the fifteenth aspect), the first public address is an address of the third node within the external tunnel.

In a seventeenth aspect according to any of the previous aspects (e.g., the fifteenth aspect), transmitting the packet includes creating an external transmission request including the packet for transmission, the first public address, and a second public address associated with the first node and transmitting the external transmission request to the second cluster via the external tunnel.

In an eighteenth aspect according to any of the previous aspects (e.g., the thirteenth aspect), the first external address is selected from a first subnet of external addresses assigned to the first cluster, and wherein the second external address is selected from a second subnet of external addresses assigned to the second cluster.

In a nineteenth aspect according to any of the previous aspects (e.g., the thirteenth aspect), the first and second private addresses are respectively addresses of the first and second nodes within the local tunnel.

In a twentieth aspect according to any of the previous aspects (e.g., the twelfth aspect), the first node is a gateway node of the first cluster and the second node is at least one of a pod executing within the first cluster and a service executing within the first cluster.

In a twenty-first aspect according to any of the previous aspects (e.g., the twelfth aspect), the local tunnel executes on a local network between a plurality of nodes within the first cluster, the plurality of nodes including the first node and the second node.

In a twenty-second aspect according to any of the previous aspects (e.g., the twelfth aspect), the external tunnel executes on a public network between the plurality of clusters.

In a twenty-third aspect, a system is provided including a first cluster containing a first computing means and a second computing means, the first computing means configured to receive a packet for transmission from the second computing means, the packet for transmission received via a local tunnel of the first cluster. The first computing means may include a routing means including an identifying means configured to identify a first destination address included within the packet for transmission and a determining means configured to determine that the first destination address corresponds to a second cluster. The first computing means may also include a generating means configured to generate a second destination address corresponding to a third computing means of the second cluster and a transmitting means configured to transmit the packet to the second destination address via an external tunnel between a plurality of clusters including the first cluster and the second cluster.

In a twenty-fourth aspect, a non-transitory, computer-readable medium is provided storing instructions which, when executed by a processor, cause the processor to receive, at a first node within a first cluster, a packet for transmission from a second node within the first cluster, the packet for transmission received via a local tunnel of the first cluster and identify, by a routing agent of the first node, a first destination address included within the packet for transmission. The non-transitory, computer-readable medium may store further instructions which, when executed by the processor, cause the processor to determine, by the routing agent, that the first destination address corresponds to a second cluster, generate, by the routing agent, a second destination address corresponding to a third node of the second cluster, and transmit, by the routing agent, the packet to the second destination address via an external tunnel between a plurality of clusters including the first cluster and the second cluster.

In a twenty-fifth aspect, a method is provided including receiving, at a first node within a first cluster, an external transmission request from a second node within a second cluster, the external transmission request received via an external tunnel between a plurality of clusters including the first cluster and the second cluster. The method may further include extracting, by a routing agent of the first node, a packet from the external transmission request, identifying, by the routing agent, an external address from the packet, the external address associated with a third node within the first cluster, and transmitting, by the routing agent, the packet to the third node via a local tunnel of the first cluster.

In a twenty-sixth aspect according to any of the previous aspects (e.g., the twenty-fifth aspect), transmitting the packet to the second node includes creating a local transmission request including the packet, a first private address of the first node, and a second private address of the third node and transmitting the local transmission request to the third node via the local tunnel.

In a twenty-seventh aspect according to any of the previous aspects (e.g., the twenty-sixth aspect), the first and second private addresses are respectively addresses of the first and third nodes within the local tunnel.

In a twenty-eighth aspect according to any of the previous aspects (e.g., the twenty-fifth aspect, the first node is a gateway node of the first cluster and the third node is at least one of a pod executing within the first cluster and a service executing within the first cluster.

In a twenty-ninth aspect according to any of the previous aspects (e.g., the twenty-fifth aspect), the local tunnel executes on a local network between a plurality of nodes within the first cluster including the first node and the third node.

In a thirtieth aspect according to any of the previous aspects (e.g., the twenty-fifth aspect), the external tunnel executes on a public network between the plurality of clusters.

In a thirty-first aspect according to any of the previous aspects (e.g., the twenty-fifth aspect), at least one of the local tunnel and the external tunnel is implemented as a secure tunnel.

In a thirty-second aspect according to any of the previous aspects (e.g., the twenty-fifth aspect), at least one of the local tunnel and the external tunnel is implemented as an unsecured tunnel.

In a thirty-third aspect according to any of the previous aspects (e.g., the twenty-fifth aspect), the external address is selected from a subnet of external addresses assigned to the first cluster.

In a thirty-fourth aspect according to any of the previous aspects (e.g., the twenty-fifth aspect, identifying the external address includes extracting the external address from the packet.

In a thirty-fifth aspect, a system is provided including a first cluster containing a first node and a second node. The first node may be configured to receive an external transmission request from a third node within a second cluster and the external transmission request may be received via an external tunnel between a plurality of clusters including the first cluster and the second cluster. The first node may include a routing agent configured to extract a packet from the external transmission request, identify an external address associated with the second node, and transmit the packet to the second node via a local tunnel of the first cluster.

In a thirty-sixth aspect according to any of the previous aspects (e.g., the thirty-fifth aspect), transmitting the packet to the second node includes creating a local transmission request including the packet, a first private address of the first node, and a second private address of the second node and transmitting the local transmission request to the second node via the local tunnel.

In a thirty-seventh aspect according to any of the previous aspects (e.g., the thirty-sixth aspect), the first and second private addresses are respectively addresses of the first and second nodes within the local tunnel.

In a thirty-eighth aspect according to any of the previous aspects (e.g., the thirty-fifth aspect), the first node is a gateway node of the first cluster and the second node is at least one of a pod executing within the first cluster and a service executing within the first cluster.

In a thirty-ninth aspect according to any of the previous aspects (e.g., the thirty-fifth aspect), the local tunnel executes on a local network between a plurality of nodes within the first cluster including the first node and the second node.

In a fortieth aspect according to any of the previous aspects (e.g., the thirty-fifth aspect), the external tunnel executes on a public network between the plurality of clusters.

In a forty-first aspect according to any of the previous aspects (e.g., the thirty-fifth aspect), at least one of the local tunnel and the external tunnel is implemented as a secure tunnel.

In a forty-second aspect according to any of the previous aspects (e.g., the thirty-fifth aspect), at least one of the local tunnel and the external tunnel is implemented as an unsecured tunnel.

In a forty-third aspect according to any of the previous aspects (e.g., the thirty-fifth aspect), the external address is selected from a subnet of external addresses assigned to the first cluster.

In a forty-fourth aspect, identifying the external address includes extracting the external address from the packet.

In a forty-fifth aspect, a system is provided including a first cluster containing a first computing means and a second computing means. The first computing means may be configured to receive an external transmission request from a third computing means within a second cluster and the external transmission request may be received via an external tunnel between a plurality of clusters including the first cluster and the second cluster. The first computing means includes a routing means that includes extracting means configured to extract a packet from the external transmission request and identifying means configured to identify an external address associated with the second computing means. The routing means may further include transmitting means configured to transmit the packet to the second computing means via a local tunnel of the first cluster.

In a forty-sixth aspect, a non-transitory, computer-readable medium is provided storing instructions which, when executed by a processor, cause the processor to receive, at a first node within a first cluster, an external transmission request from a second node within a second cluster. The external transmission request may be received via an external tunnel between a plurality of clusters including the first cluster and the second cluster. The non-transitory, computer-readable medium may store further instructions which, when executed by the processor, cause the processor to extract, by a routing agent of the first node, a packet from the external transmission request, identify, by the routing agent, an external address associated with a third node within the first cluster, and transmit, by the routing agent, the packet to the third node via a local tunnel of the first cluster.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving, at a first node within a first cluster, a packet for transmission from a second node within the first cluster, the packet for transmission received via a local tunnel of the first cluster;
   identifying, by a routing agent of the first node, a first destination address included within the packet for transmission;
   determining, by the routing agent, that the first destination address corresponds to a second cluster;
   generating, by the routing agent, a second destination address corresponding to a third node of the second cluster; and
   transmitting, by the routing agent, the packet to the second destination address via an external tunnel between a plurality of clusters including the first cluster and the second cluster.

2. The method of claim 1, further comprising, at the second node:
   creating the packet for transmission including a first address associated with the second node and a second address associated with the third node;
   creating a local transmission request including the packet for transmission, a first local address of the first node, and a second local address of the second node; and
   transmitting the local transmission request to the first node via the local tunnel.

3. The method of claim 2, wherein identifying the first destination address comprises:
   extracting the packet for transmission from the local transmission request; and
   identifying the second address as the first destination address.

4. The method of claim 3, wherein generating the second destination address includes determining a first public address associated with the third node.

5. The method of claim 4, wherein the first public address is an address of the third node within the external tunnel.

6. The method of claim 4, wherein transmitting the packet comprises:
   creating an external transmission request including the packet for transmission, the first public address, and a second public address associated with the first node; and
   transmitting the external transmission request to the second cluster via the external tunnel.

7. The method of claim 2, wherein the second address is selected from a subnet of external addresses assigned to the second cluster.

8. The method of claim 7, wherein the first address is replaced in the packet with an external address associated with the first cluster.

9. The method of claim 1, wherein the first node is a gateway node of the first cluster and the second node executes at least one of a pod and a service associated with the packet.

10. The method of claim 1, wherein the local tunnel executes on a local network between a plurality of nodes within the first cluster, the plurality of nodes including the first node and the second node.

11. The method of claim 1, wherein the external tunnel executes on a public network between the plurality of clusters.

12. A system comprising:
a first cluster containing at least one processor and at least one memory containing instructions which, when executed by the at least one processor, cause the at least one processor to implement a first node and a second node, the first node configured to receive an external transmission request from a third node within a second cluster, the external transmission request received via an external tunnel between a plurality of clusters including the first cluster and the second cluster,
wherein the first node includes a routing agent configured to:
extract a packet from the external transmission request;
identify an address associated with the second node; and
transmit the packet to the second node via a local tunnel of the first cluster, wherein the local tunnel is separate from the external tunnel.

13. The system of claim 12, wherein transmitting the packet to the second node comprises:
creating a local transmission request including the packet, a first local address of the first node, and a second local address of the second node; and
transmitting the local transmission request to the second node via the local tunnel.

14. The system of claim 13, wherein the first and second local addresses are respectively addresses of the first and second nodes within the local tunnel.

15. The system of claim 12, wherein the first node is a gateway node of the first cluster and the second node is executing at least one of a pod and a service intended to receive the packet.

16. The system of claim 12, wherein at least one of the local tunnel and the external tunnel is implemented as a secure tunnel.

17. The system of claim 12, wherein at least one of the local tunnel and the external tunnel is implemented as an unsecured tunnel.

18. The system of claim 12, wherein the address is selected from a subnet of external addresses assigned to the first cluster.

19. The system of claim 12, wherein identifying the address comprises extracting an external address of the second node from the packet.

20. A non-transitory, computer-readable medium storing instructions which, when executed by a processor, cause the processor to:
receive, at a first node within a first cluster, an external transmission request from a second node within a second cluster, the external transmission request received via an external tunnel between a plurality of clusters including the first cluster and the second cluster;
extract, by a routing agent of the first node, a packet from the external transmission request;
identify, by the routing agent, an address associated with a third node within the first cluster; and
transmit, by the routing agent, the packet to the third node via a local tunnel of the first cluster, wherein the local tunnel is separate from the external tunnel.

\* \* \* \* \*